(12) United States Patent
Sasaki

(10) Patent No.: US 10,750,035 B2
(45) Date of Patent: Aug. 18, 2020

(54) ELECTRONIC DEVICE, SYSTEM, METHOD FOR PROCESSING INFORMATION, AND RECORDING MEDIUM

(71) Applicant: Makoto Sasaki, Kanagawa (JP)

(72) Inventor: Makoto Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/266,218

(22) Filed: Feb. 4, 2019

(65) Prior Publication Data

US 2019/0289144 A1  Sep. 19, 2019

(30) Foreign Application Priority Data

Mar. 19, 2018 (JP) .................. 2018-051618

(51) Int. Cl.
*H04N 1/00* (2006.01)
*H04N 1/44* (2006.01)

(52) U.S. Cl.
CPC ..... *H04N 1/00344* (2013.01); *H04N 1/00244* (2013.01); *H04N 1/00323* (2013.01); *H04N 1/00408* (2013.01); *H04N 1/4433* (2013.01); *H04N 2201/0094* (2013.01)

(58) Field of Classification Search
CPC .......... H04N 1/00344; H04N 1/00244; H04N 1/00408; H04N 1/00323; H04N 1/4433; H04N 2201/0094
USPC .................................................... 358/1.15
See application file for complete search history.

(56) References Cited

U.S. PATENT DOCUMENTS

| 5,887,216 A | * | 3/1999 | Motoyama | .......... | G06F 11/0709 358/1.15 |
| 2015/0237227 A1 | * | 8/2015 | Saisho | .............. | H04N 1/00875 348/77 |

FOREIGN PATENT DOCUMENTS

| JP | 2002-258682 | 9/2002 |
| JP | 2007-206999 | 8/2007 |
| JP | 2009-239461 | 10/2009 |
| JP | 2015-153325 | 8/2015 |

* cited by examiner

*Primary Examiner* — Tammy Paige Goddard
*Assistant Examiner* — Darryl V Dottin
(74) *Attorney, Agent, or Firm* — Harness, Dickey & Pierce, P.L.C.

(57) ABSTRACT

An electronic device includes: an operation receiving unit to receive operation from a user; a sensor to sense the user existing in a detection range of the electronic device to output detection information indicating that the user exists in the detection range; and processing circuitry to output content for assisting the user in operating the electronic device, when the processing circuitry has determined that the user exists in the detection range based on the detection information and when an elapsed time in which the operation of the user is not received at the operation receiving unit has exceeded a threshold time.

19 Claims, 12 Drawing Sheets

FIG. 6

| DISPLAY LANGUAGE | MODEL NAME | APPLICATION NAME | SCREEN INFORMATION |
|---|---|---|---|
| ja | MP_C2504 | Copy | check_network_1401 |
| en | MP_C3004 | Scan | check_network_1403 |
| fr | MP_C4504 | Fax | check_network_1407 |
| de | MP_C5504 | home | check_network_1409 |
| .. | .. | .. | .. |
| es | MP_C6004 | quickCopy | check_network_1451 |
| nl | MP_C2094 | quickScan | msg_certify_err |

FIG. 7

| MODEL NAME | APPLICATION NAME | SCREEN INFORMATION | LANGUAGE | URL |
|---|---|---|---|---|
| MP_C2504 | Copy | check_network_1401 | ja | http://xxx/yyy/11001.html |
|  |  |  | en | http://xxx/yyy/11001_en.html |
| MP_C3004 | Scan | check_network_1403 | ja | http://xxx/yyy/11002.html |
|  |  |  | en | http://xxx/yyy/11002_en.html |
|  |  |  | fr | http://xxx/yyy/11002_fr.html |
|  |  |  |  |  |

86

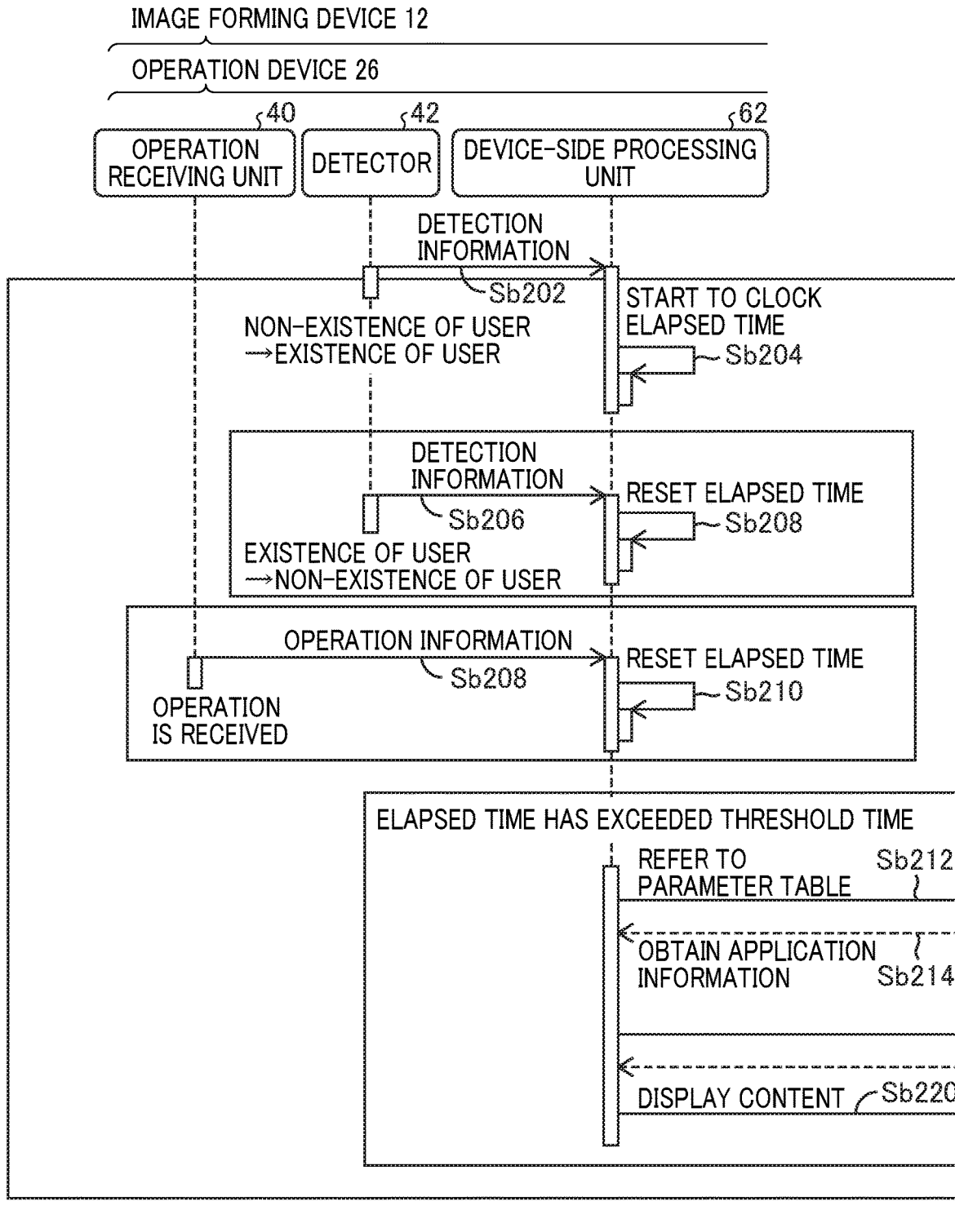

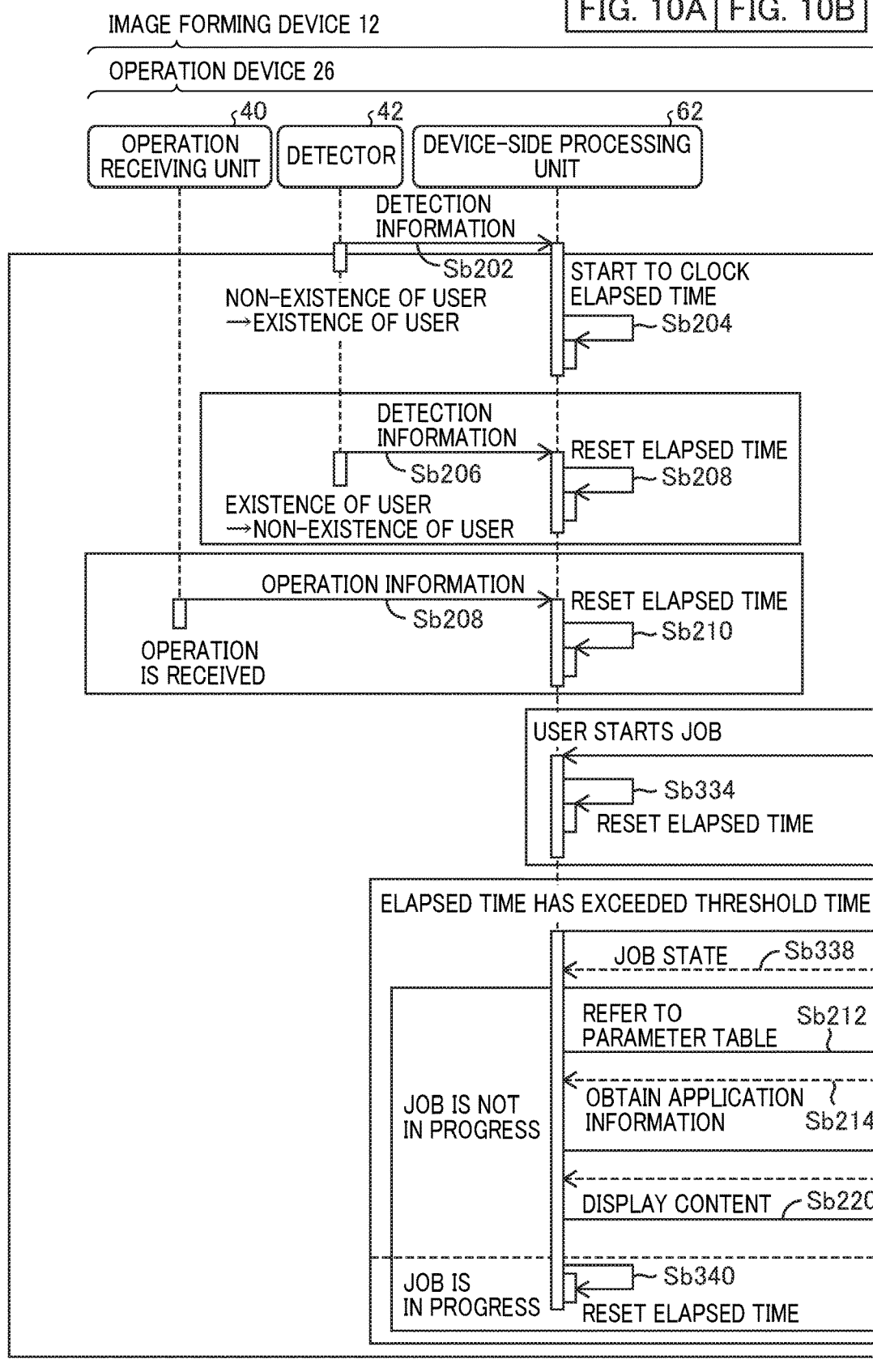

ELECTRONIC DEVICE, SYSTEM, METHOD FOR PROCESSING INFORMATION, AND RECORDING MEDIUM

CROSS-REFERENCE TO RELATED APPLICATIONS

This patent application is based on and claims priority pursuant to 35 U.S.C. § 119(a) to Japanese Patent Application No. 2018-051618, filed on Mar. 19, 2018, in the Japan Patent Office, the entire disclosure of which is hereby incorporated by reference herein.

BACKGROUND

Technical Field

The present invention relates to an electronic device, a system, a method for processing information, and a recording medium.

Discussion of the Background Art

Since an electronic device such as a multi-function peripheral (MFP) has a plurality of functions or complex functions, it may be difficult to understand a method of operation in some cases. Accordingly, such an electronic device outputs, for example, a content image such as help content indicating contents of operation to teach a method of operation to a user.

Such an electronic device outputs the content indicating how to operate the electronic device when the user who wishes to know the method of operation and desires the content operates a help button on an operation receiving unit such as a touch panel.

SUMMARY

Example embodiments of the present invention include an electronic device including: an operation receiving unit to receive operation from a user; a sensor to sense the user existing in a detection range of the electronic device to output detection information indicating that the user exists in the detection range; and processing circuitry to output content for assisting the user in operating the electronic device, when the processing circuitry has determined that the user exists in the detection range based on the detection information and when an elapsed time in which the operation of the user is not received at the operation receiving unit has exceeded a threshold time.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an illustration of an exemplary parameter table;

FIG. 7 is an illustration of an exemplary content management table;

FIGS. 9A and 9B (FIG. 9) is a sequence diagram illustrating processing performed by the image forming device and the content management server according to the first embodiment;

FIGS. 10A and 10B (FIG. 10) is a sequence diagram illustrating processing performed by the image forming device and the content management server according to a second embodiment.

Figure 1:
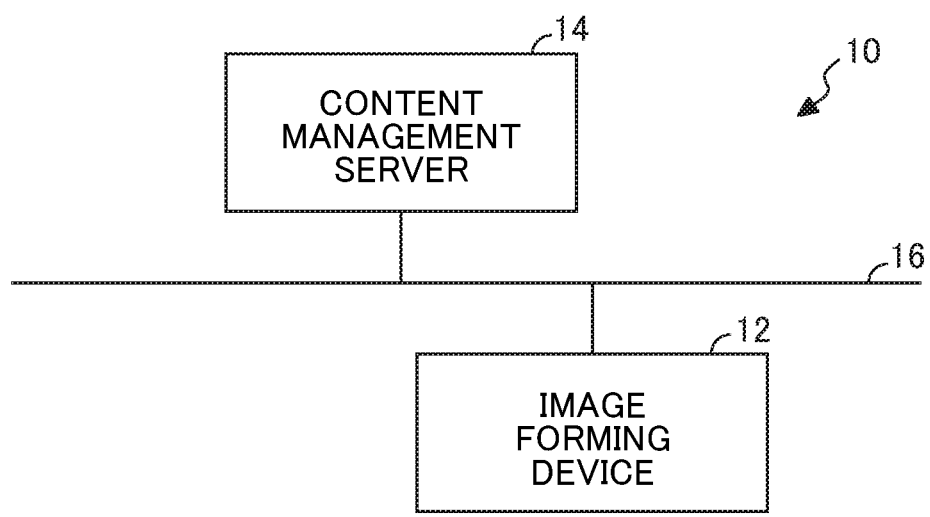
FIG. 1 is a diagram illustrating a general arrangement of an image processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Similar constituent elements according to the following exemplary embodiments and the like will be denoted by the same reference signs, and duplicate descriptions will be omitted as appropriate.

First Embodiment

FIG. 1 is a diagram illustrating a general arrangement of an image processing system 10 according to an embodiment. As illustrated in FIG. 1, the image processing system 10 includes an image forming device 12 and a content management server 14, connected via a network 16.

The image forming device 12 is an example of an electronic device, which may be an MFP having at least two functions of a copy function, a printer function, a scanner function, and a facsimile communication function.

In response to a request from the image forming device 12, the content management server 14 provides the image forming device 12 with help content indicating how to operate the image forming device 12 via the network 16. In this disclosure, the help content is any content that assists the user in operating the image forming device 12.

The network 16 connects the image forming device 12 and the content management server 14 so as to allow exchange of information therebetween. The network 16 may be, for example, a local area network (LAN). The network 16 may further include the Internet.

Figure 2:
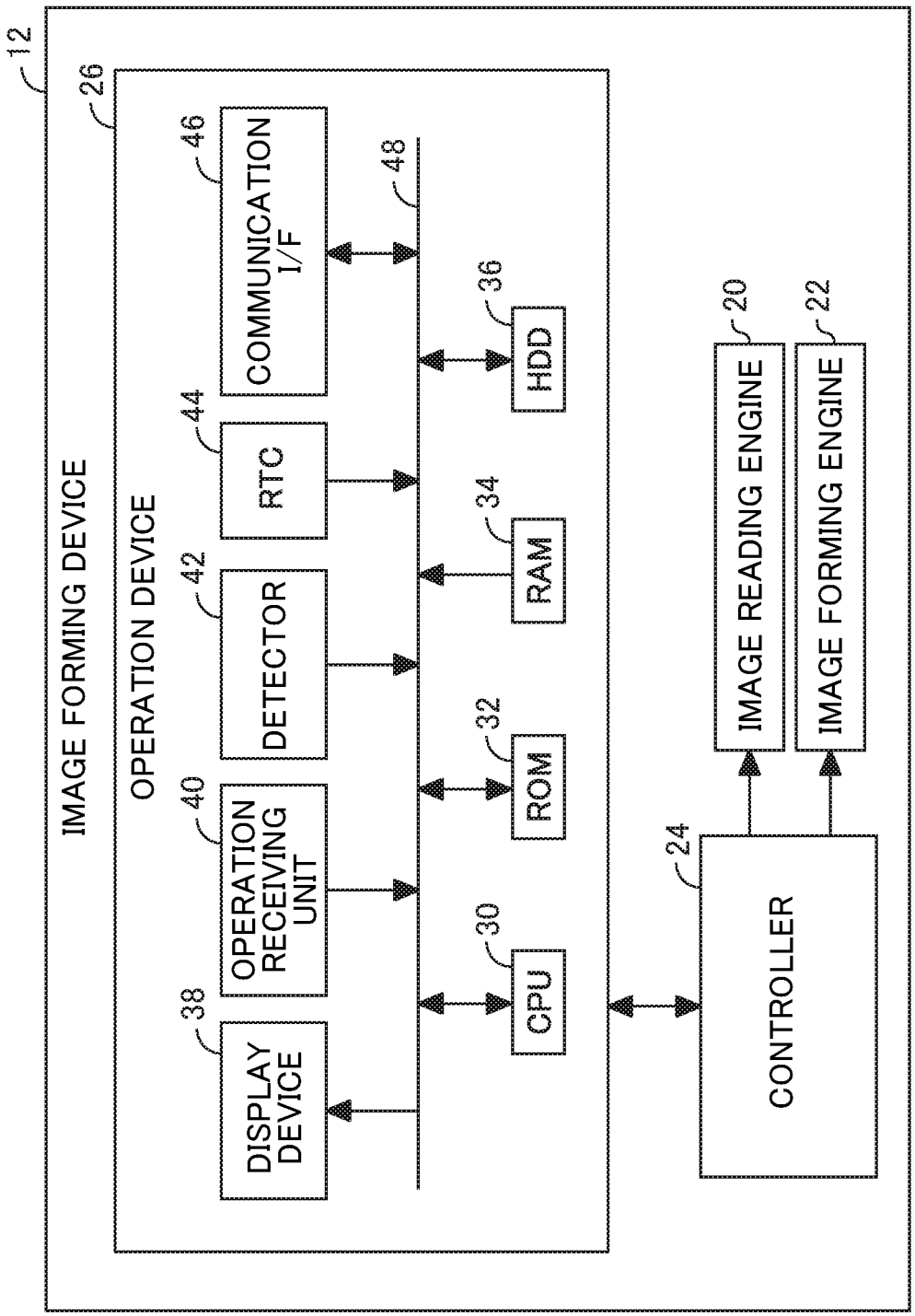
FIG. 2 is a diagram illustrating a hardware configuration of an image forming device, according to the embodiment.

FIG. 2 is a diagram illustrating an exemplary hardware configuration of the image forming device 12. As illustrated in FIG. 2, the image forming device 12 includes an image reading engine 20, an image forming engine 22, a controller 24, and an operation device 26.

The image reading engine 20, which is also referred to as a scanner engine, reads a document into digital image data using a charge-coupled device (CCD) or the like, and performs image processing such as shading correction, background removal, and fixed value encoding.

Based on the image data processed by the image reading engine 20 (or further by the controller 24), the image forming engine 22 forms a monochrome or color image on, for example, a recording sheet such as paper using a printing method such as an inkjet printing method or an electrophotographic printing method. The image forming engine 22, which may also be referred to as a printing engine, may include, for example, either a monochrome plotter, a one-drum color plotter, or a four-drum color plotter.

The controller 24 controls entire operation of the image forming device 12. The controller 24 may be a computer including a central processing unit (CPU) that executes various programs of the image forming device 12, an application specific integrated circuit (ASIC) for image processing, and a storage device including a read-only memory (ROM), a random access memory (RAM), and a hard disk drive (HDD). The controller 24 controls the image reading engine 20 and the image forming engine 22, and executes, for example, processing on an image read by the image reading engine 20 and an image to be output to the image forming engine 22.

The operation device 26 may be a computer that functions as a user interface of the image forming device 12. The operation device 26 is connected to the controller 24 in such a manner that information is exchangeable therebetween. The operation device 26 includes a CPU 30, a ROM 32, a RAM 34, an HDD 36, a display device 38, an operation receiving unit 40, a detector 42, a real time clock (RTC) 44, a communication interface (I/F) 46, and a bus 48. The CPU 30, the ROM 32, the RAM 34, the HDD 36, the display device 38, the operation receiving unit 40, the detector 42, the RTC 44, and the communication I/F 46 are connected to each other via the bus 48.

The CPU 30 is a hardware processor such as a central processing unit for executing arithmetic processing and control processing, which regulates overall control of the operation device 26. The CPU 30 reads a program stored in the ROM 32 or the HDD 36, and loads and executes the program on the RAM 34, thereby controlling the operation device 26.

The ROM 32 is a non-volatile memory that stores a program (e.g., basic input/output system (BIOS)) executed by the CPU 30. The RAM 34 is a volatile memory used by the CPU 30 as a work area or the like in various processes. The HDD 36 is an auxiliary storage device that stores various programs, data, and the like. The HDD 36 stores a program and data for controlling the operation device 26.

The display device 38 displays, based on the image data generated by the CPU 30, an image related to operation of the image forming device 12. The display device 38 displays, for example, an image for receiving operation and the help content as an image related to the operation. The display device 38 is a display device such as a liquid crystal display (LCD) and an organic electro luminescence (EL).

The operation receiving unit 40 receives the operation made by the user related to the image forming device 12, and outputs the contents of the operation to the CPU 30. The operation receiving unit 40 may be, for example, a physical button and a switch, and a touch panel provided on the surface of the display device 38. Any form may be adopted as long as it can receive the operation made by the user. As another example, a microphone or the like for detecting voice of the user also functions as the operation receiving unit 40.

The detector 42 detects a user existing in a detection range around the image forming device 12. The detector 42 may be a human detection sensor of any kind that detects a human using infrared rays or the like. The detector 42 outputs, to the CPU 30, detection information indicating that the user exists in the detection range. Note that the detector 42 may be connected to the image forming device 12 without interposing the operation device 26 therebetween, or may be connected to the image forming device 12 as an external detection device to transmit the detection information to the image forming device 12.

The RTC 44 counts time, and outputs the counted time to the CPU 30.

The communication I& 46 is an interface that communicates with an external device such as the content management server 14 via the network 16.

Further, in this example, the operation device 26 may be provided such that is can be removed from a body (main frame) of the electronic device 12. In such case, the operation device 26 may function as a remote controller that can remotely control the electronic device 12, while the operation device 26 can be held at, for example, a user's hand.

Figure 3:
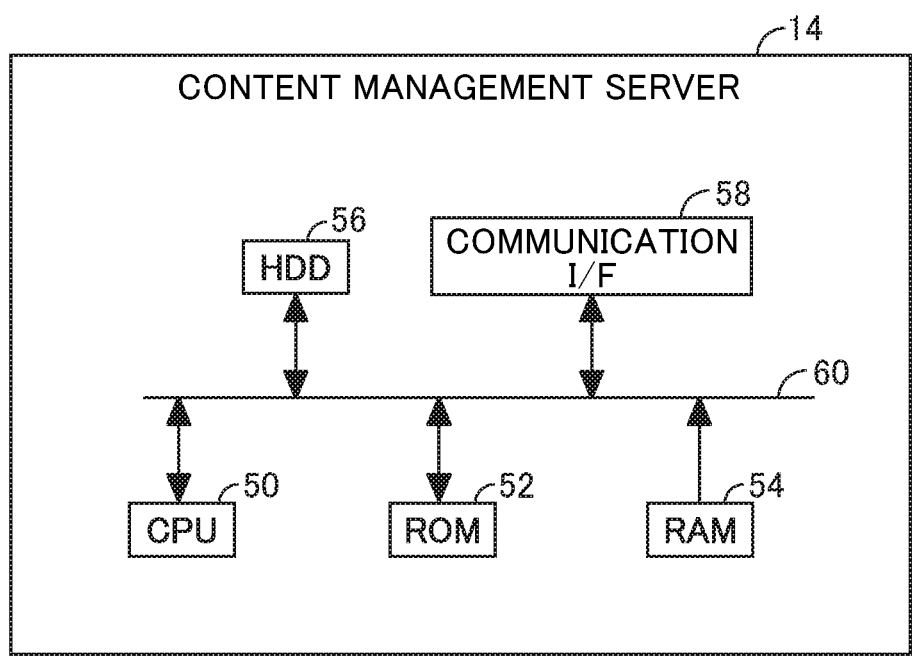
FIG. 3 is a diagram illustrating a hardware configuration of a content management server, according to the embodiment.

FIG. 3 is a diagram illustrating an exemplary hardware configuration of the content management server 14. As illustrated in FIG. 3, the content management server 14 includes a CPU 50, a ROM 52, a RAM 54, an HDD 56, a communication I/F 58, and a bus 60. The CPU 50, the ROM 52, the RAM 54, the HDD 56, and the communication I/F 58 are connected to each other via the bus 60.

The CPU 50 is a hardware processor such as a central processing unit for executing arithmetic processing and control processing, which regulates overall control of the content management server 14. The CPU 50 reads a program stored in the ROM 52 or the HDD 56, and loads and executes the program on the RAM 54, thereby controlling the content management server 14.

The ROM 52 is a non-volatile memory that stores a program (e.g., BIOS) executed by the CPU 50. The RAM 54 is a volatile memory used by the CPU 50 as a work area or the like in various processes. The HDD 56 is an auxiliary storage device that stores various programs, data, and the like. The HDD 56 stores a program and data for controlling the content management server 14.

The communication I/F 58 is an interface that communicates with an external device such as the image forming device 12 via the network 16.

Figure 4:
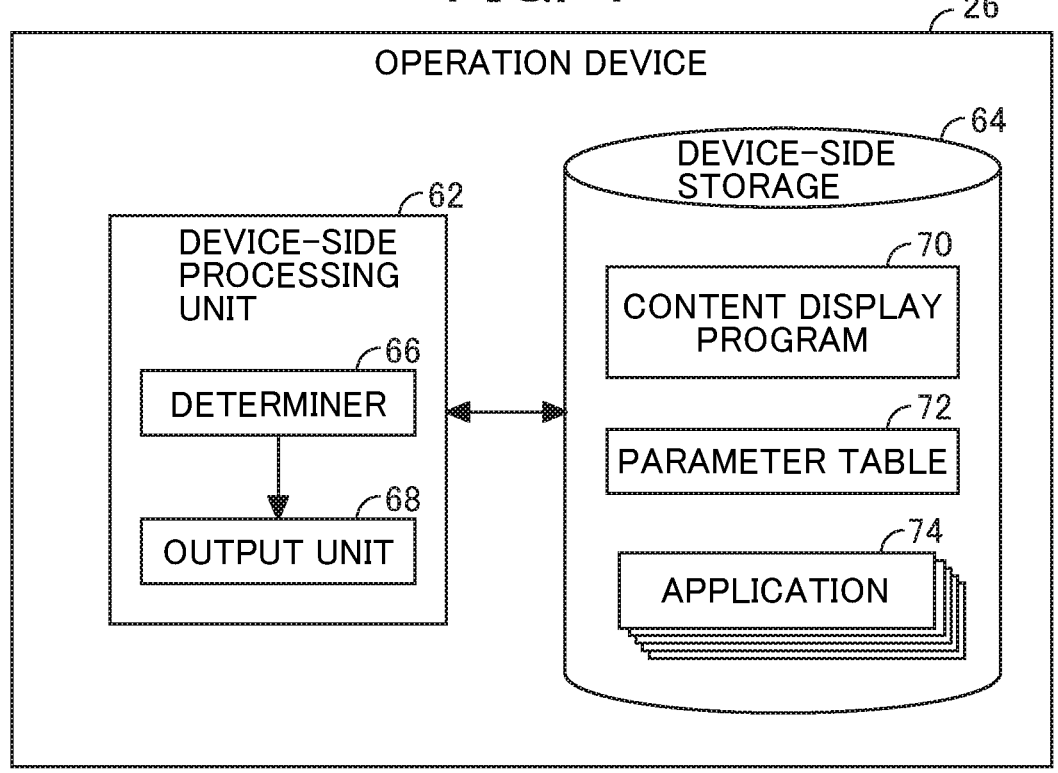
FIG. 4 is a functional block diagram illustrating a function of an operation device, according to the embodiment.

FIG. 4 is a functional block diagram illustrating the function of the operation device 26. As illustrated in FIG. 4, the operation device 26 includes a device-side processing unit 62 and a device-side storage 64.

The device-side processing unit 62 is implemented by the CPU 30. The device-side processing unit 62 includes a determiner 66 and an output unit 68. The determiner 66 and the output unit 68 are implemented by the CPU 30, which executes content display program 70 stored in the device-side storage 64. A part of or all of the determiner 66 and the output unit 68 may be implemented by hardware such as an application specific integrated circuit (ASIC) and a field-programmable gate array (FPGA).

When the detection information indicates that the user exists in the detection range, the determiner 66 determines whether an elapsed time, which is a time when the operation receiving unit 40 has not received the operation from the user via the operation receiving unit 40, has exceeded a threshold time. The elapsed time is used for determining whether or not to request the help content to the content management server 14. The threshold time may be set in advance and stored in the device-side storage 64, which may be several tens of seconds, for example. In a case where the elapsed time has exceeded the threshold time, the determiner 66 outputs the determination result to the output unit 68. Specifically, the determiner 66 determines whether the user exists in the detection range around the image forming device 12 based on the detection information obtained from the detector 42. The determiner 66 determines whether the operation receiving unit 40 is operated by the user based on the operation information obtained from the operation receiving unit 40. When it is determined that the user exists based on the detection information and that the operation receiving unit 40 is not operated by the user based on the operation information, the determiner 66 starts counting the elapsed time based on the time obtained from the RTC 44. The determiner 66 resets the elapsed time when the user no longer exists or when the operation receiving unit 40 receives operation from the user. The determiner 66 continues to count the elapsed time while the user exists and the operation receiving unit 40 is not being operated by the user, and when the elapsed time has exceeded the threshold time, outputs the determination result indicating the status to the output unit 68.

When the elapsed time has exceeded the threshold time and the determination result thereof is obtained, the output unit 68 outputs the help content that is content for describing how to operate the image forming device 12. Specifically, when the determination result is obtained from the determiner 66, the output unit 68 obtains, from a parameter table 72 stored in the device-side storage 64, application information that is information associated with an application 74 displayed on the forefront of the display device 38. The application 74 displayed on the forefront is an application used by the user. For example, it is a copy application used when the user executes copying, or an authentication application used when the user logs into the MFP. The output unit 68 transmits a help content request including application information to the content management server 14. The output unit 68 obtains the help content from the content management server 14. The output unit 68 outputs the obtained help content to the display device 38 for display. In other words, in a case where the determiner 66 determines, based on the detection information, that the user exists in the detection range during the period until the elapsed time exceeds the threshold time, the output unit 68 obtains the help content and outputs it to the display device 38 for display even if the operation of the user is not received.

The device-side storage 64 is implemented as functions of the RAM 34, the ROM 32, and the HDD 36. The device-side storage 64 may be an external storage device on the network 16. The device-side storage 64 stores a program to be executed by the device-side processing unit 62, data for executing the program, and the like. For example, the device-side storage 64 stores the content display program 70 to be executed by the device-side processing unit 62, and the parameter table 72 for executing the content display program 70. The device-side storage 64 stores one or a plurality of applications 74 to be executed by the device-side processing unit 62. One or a plurality of applications 74 is a program for executing copying, scanning, and the like.

The content display program 70 to be executed by the device-side processing unit 62 according to the embodiment has a module configuration including respective units described above (determiner 66 and output unit 68). As actual hardware, the CPU 30 reads the content display program 70 from the ROM 32 or the HDD 36 to execute the read program, and the respective units described above are loaded on the main storage such as the RAM 34. Accordingly, the determiner 66 and the output unit 68 are generated on the main storage, and those functions are implemented by the computer.

For example, the content display program 70 to be executed by the device-side processing unit 62 according to the embodiment is provided in a state of being incorporated in the ROM 32 or the HDD 36 in advance. The content display program 70 to be executed by the device-side processing unit 62 according to the embodiment may be provided in a state of being recorded in a computer readable recording medium such as a CD-ROM, a flexible disk (FD), a CD-R, and a digital versatile disk (DVD), as a file in an installable format or an executable format.

Further, the content display program 70 to be executed by the device-side processing unit 62 according to the embodiment may be provided in such a manner that it is stored in a computer connected to the network 16 such as the Internet, and is downloaded via the network 16. Furthermore, the content display program 70 to be executed by the device-side processing unit 62 according to the embodiment may be provided or distributed via the network 16 such as the Internet.

Figure 5:
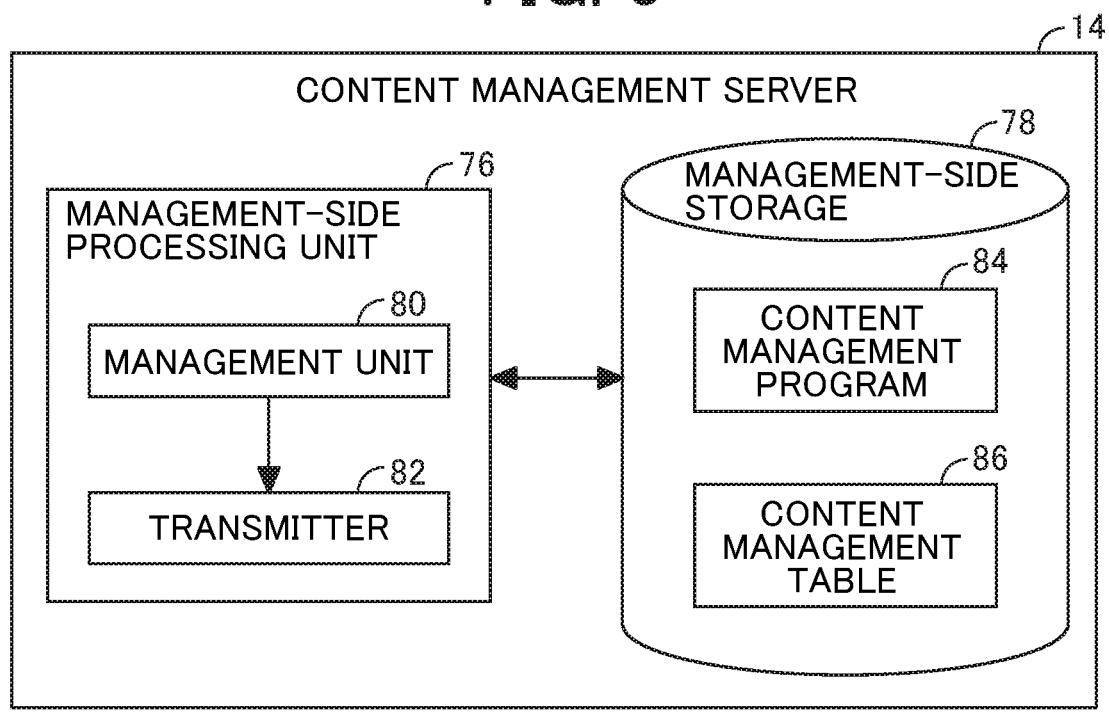
FIG. 5 is a functional block diagram illustrating a function of the content management server, according to the embodiment.

FIG. 5 is a functional block diagram illustrating the function of the content management server 14. The content management server 14 functions as a management-side processing unit 76 and a management-side storage 78.

The management-side processing unit 76 is implemented as a function of the CPU 50. The management-side processing unit 76 includes a management unit 80 and a transmitter 82. The management unit 80 and the transmitter 82 may be functions implemented by the management-side processing unit 76 reading a content management program 84 stored in the management-side storage 78. A part of or all of the management unit 80 and the transmitter 82 may be implemented by hardware such as the ASIC and the FPGA.

When a help content request is obtained from the operation device 26, the management unit 80 obtains, based on application information included in the help content request, the help content corresponding to the application 74 displayed on the forefront of the operation device 26. For example, the management unit 80 obtains help content information associated with the application information from a content management table 86 stored in the management-side storage 78. The management unit 80 may obtain the help content via the network 16 or the like based on, for example, a uniform resource locator (URL) indicated by the help content information. The management unit 80 outputs the obtained help content to the transmitter 82.

The transmitter 82 transmits the obtained help content to the operation device 26 via the network 16.

The management-side storage 78 is implemented as functions of the RAM 54, the ROM 52, and the HDD 56. The management-side storage 78 may be an external storage device on the network 16. The management-side storage 78 stores a program to be executed by the management-side processing unit 76, data for executing the program, and the like. For example, the management-side storage 78 stores the content management program 84 to be executed by the management-side processing unit 76, and the content management table 86 for executing the content management program 84.

The content management program 84 to be executed by the management-side processing unit 76 according to the embodiment has a module configuration including respective units described above (management unit 80 and transmitter 82). As actual hardware, the CPU 50 reads the content management program 84 from the ROM 52 or the HDD 56 to execute it, whereby the respective units described above are loaded on the main storage such as the RAM 54. Accordingly, the management unit 80 and the transmitter 82 are generated on the main storage, and those functions are implemented by the computer.

For example, the content management program 84 to be executed by the management-side processing unit 76 according to the embodiment is provided in a state of being incorporated in the ROM 52 or the HDD 56 in advance. The content management program 84 to be executed by the operation device 26 according to the embodiment may be provided in a state of being recorded in a computer readable recording medium such as a CD-ROM, a flexible disk, a CD-R, and a DVD, as a file in an installable format or an executable format.

Further, the content management program 84 to be executed by the management-side processing unit 76 according to the embodiment may be provided in such a manner that it is stored in a computer connected to the network 16 such as the Internet, and is downloaded via the network 16. Furthermore, the content management program 84 to be executed by the management-side processing unit 76 according to the embodiment may be provided or distributed via the network 16 such as the Internet.

FIG. 6 is a table illustrating an example of the parameter table 72. The parameter table 72 includes a plurality of pieces of application information. As illustrated in FIG. 6, the application information includes a display language of the application 74, a model name of the image forming device 12, an application name of the application 74, and screen information of the application 74, which are associated with each other. The output unit 68 obtains, from the parameter table 72, the application information associated with the application 74 displayed on the forefront of the display device 38 based on the application name, and transmits the help content request including the application information to the content management server 14. Accordingly, the output unit 68 obtains the help content corresponding to the foremost application 74 from the content management server 14.

FIG. 7 is a table illustrating an example of the content management table 86. The content management table 86 includes one or more pieces of content information. As illustrated in FIG. 7, the content information includes a model name of the image forming device 12, an application name, screen information of the application 74, a language of the application 74, and a URL of the help content, which are associated with each other. When the application information is obtained from the operation device 26, the management unit 80 obtains the content information from the content management table 86 based on, for example, the screen information included in the application information. The management unit 80 obtains the help content based on the URL indicated by the obtained content information, and outputs it to the transmitter 82. The transmitter 82 transmits the help content to the operation device 26.

Figure 8:
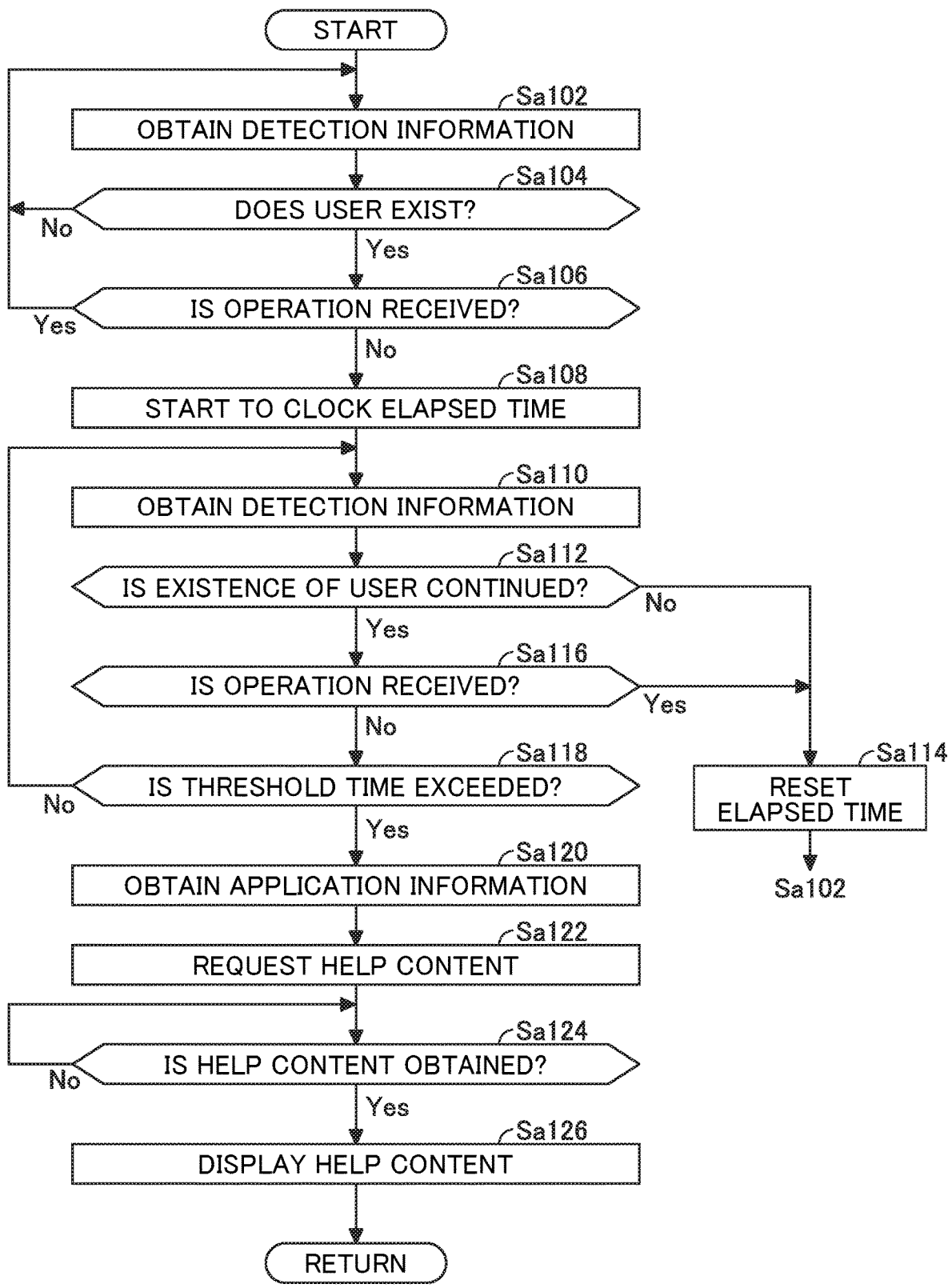
FIG. 8 is a flowchart illustrating a content display process according to a first embodiment performed by the operation device.

FIG. 8 is a flowchart of a content display process according to the first embodiment executed by the device-side processing unit 62 of the operation device 26. The device-side processing unit 62 reads the content display program 70 to execute the content display process.

In the content display process illustrated in FIG. 8, the determiner 66 obtains the detection information from the detector 42 (Sa102). The determiner 66 determines whether the user exists in the detection range around the image forming device 12 based on the detection information (Sa104). When it is determined that the user does not exist based on the detection information (No in Sa104), the determiner 66 repeats step Sa102. When it is determined that the user does not exist based on the detection information (Yes in Sa104), the determiner 66 determines whether the operation on the image forming device 12 made by the user is received based on the operation information from the operation receiving unit 40 (Sa106). When it is determined that the operation on the image forming device 12 made by the user is received based on the operation information (Yes in Sa106), the determiner 66 repeats step Sa102 and the subsequent steps.

When it is determined that the operation of the user is not received based on the operation information (No in Sa106), the determiner 66 starts to count the elapsed time with the current time counted by the RTC 44 being set as the start time (Sa108). The determiner 66 obtains the detection information from the detector 42 (Sa110), and determines whether the existence of the user is continued (Sa112). When it is determined that the existence of the user is not continued (No in Sa112), the determiner 66 resets the elapsed time (Sa114), and repeats step Sa102 and the subsequent steps. When it is determined the existence of the user is continued (Yes in Sa112), the determiner 66 determines whether the operation on the image forming device 12 made by the user is received based on the operation information from the operation receiving unit 40 (Sa116). When it is determined that the operation of the user is received based on the operation information (Yes in Sa116), the determiner 66 resets the elapsed time (Sa114), and repeats step Sa102 and the subsequent steps.

When it is determined that the operation of the user is not received based on the operation information (No in Sa116), the determiner 66 determines whether the elapsed time has exceeded the threshold time (Sa118). When it is determined that the elapsed time has not exceeded the threshold time (No in Sa118), the determiner 66 repeats step Sa110 and the subsequent steps.

When the determiner 66 determines that the elapsed time has exceeded the threshold time (Yes in Sa118), the output unit 68 refers to the parameter table 72 to obtain the application information including, for example, the screen information of the application 74 displayed on the forefront of the display device 38 (Sa120). The output unit 68 outputs the help content request including the application information to the content management server 14 via the network 16 (Sa122).

When the help content request is obtained, the content management server 14 obtains the help content based on the URL associated with the application information in the content management table 86, and transmits it to the operation device 26 via the network 16.

The output unit 68 is in a standby state until the help content is obtained (No in Sa124). When the help content transmitted by the content management server 14 is obtained (Yes in Sa124), the output unit 68 outputs the help content to the display device 38 for display (Sa126). The device-side processing unit 62 repeats step Sa102 and the subsequent steps thereafter.

Figure 9B:
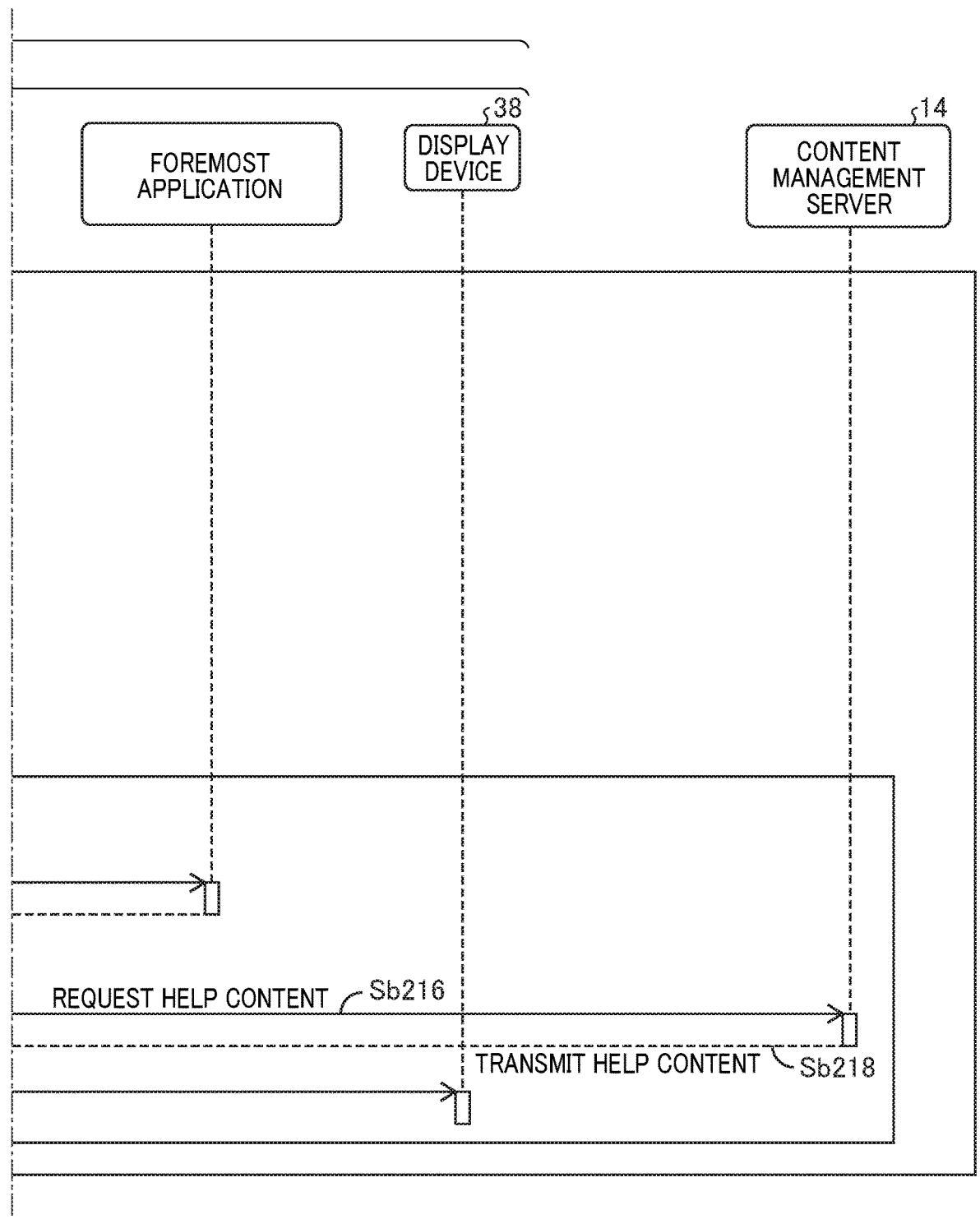

FIG. 9 is a sequence diagram according to the first embodiment illustrating processing between the image forming device 12 and the content management server 14. Among the processing illustrated in FIG. 9, descriptions of the processing that overlaps the processing in FIG. 8 will be simplified.

As illustrated in FIG. 9, in a case where the detector 42 outputs, to the device-side processing unit 62, the detection information indicating that the state in which the user does not exist in the detection range around the image forming device 12 has changed to the state in which the user exists (Sb202) and there is no operation information from the operation receiving unit 40, the determiner 66 of the device-side processing unit 62 starts to clock the elapsed time (Sb204).

When the detector 42 outputs, to the device-side processing unit 62, the detection information indicating that the state in which the user exists in the detection range around the image forming device 12 has changed to the state in which the user exists (Sb206), the determiner 66 of the device-side processing unit 62 resets the elapsed time (Sb208).

When the operation receiving unit 40 receives the operation from the user to outputs the operation information to the device-side processing unit 62 (Sb208), the determiner 66 of the device-side processing unit 62 resets the elapsed time (Sb210).

When the determiner 66 of the device-side processing unit 62 determines that the elapsed time has exceeded the threshold time, the output unit 68 refers to the parameter table 72 (Sb212) to obtain the application information associated with the application 74 displayed on the forefront of the display device 38 (Sb214). The output unit 68 of the device-side processing unit 62 transmits the help content request including the application information to the content management server 14 (Sb216).

When the help content request is obtained, the content management server 14 transmits the help content (Sb218). When the help content transmitted by the content management server 14 is obtained, the output unit 68 of the device-side processing unit 62 outputs the help content to the display device 38 for display (Sb220).

As described above, even if no instruction is received from the user, the operation device 26 according to the first embodiment outputs the help content when the elapsed time of the state in which the user exists around the operation device 26 without operating the operation receiving unit 40 has exceeded the threshold time. As a result, even in a case where the user is uncertain about the method of operation for outputting the help content, the operation device 26 automatically provides the user with the help content, whereby convenience of the user in outputting the help content can be improved. Furthermore, the operation device 26 obtains the help content when it is determined that the user exists in the detection range during the period until the elapsed time exceeds the threshold time.

Accordingly, the operation device 26 can obtain the help content when the necessity is high, whereby the processing load of the content management server 14 can be reduced.

Second Embodiment

Next, a content display process according to a second embodiment in which an elapsed time is reset and help content related to a method of operation is output based on a state of a job (hereinafter referred to as job state) to be executed in an image forming device 12, such as a print job and a scan job, will be described.

A determiner 66 according to the second embodiment resets the elapsed time according to the job state obtained from a controller 24. For example, when the image forming device 12 starts a job such as a print job and a scan job, the elapsed time being clocked is reset. Further, when the elapsed time being clocked has exceeded a threshold time, the determiner 66 requests and obtains the job state from the controller 24, and resets the elapsed time when it is determined that the job state indicates the state being executed. In this case, an output unit 68 does not output the help content.

Figure 10B:
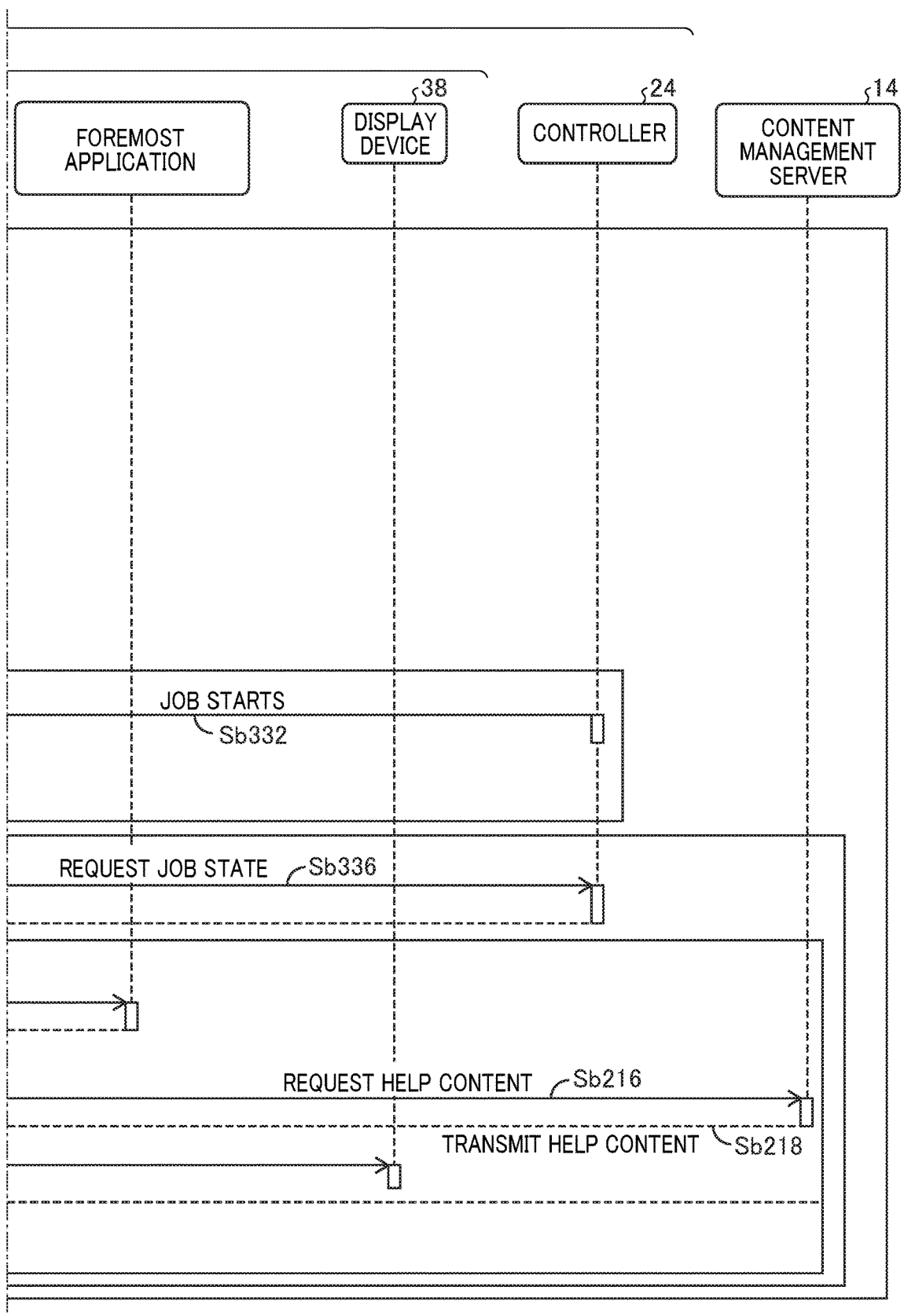

FIG. 10 is a sequence diagram according to the second embodiment illustrating processing between the image forming device 12 and a content management server 14. Among the processing illustrated in FIG. 10, descriptions of processing similar to that in the first embodiment described above will be omitted or simplified.

As illustrated in FIG. 10, in a case where, after existence of a user is detected. (Sb202) and clocking of the elapsed time is started (Sb204), the existence of the user is continued and no operation is performed, the controller 24 notifies the determiner 66 of a device-side processing unit 62 of the start of a job such as a print job and a scan job (Sb332), and then the determiner 66 resets the elapsed time being clocked (Sb334). Note that the start of the job in the case where no operation on an operation device 26 is performed includes, for example, a start of a job such as printing received from an external device such as a laptop personal computer connected to the image forming device 12 via a network 16.

when the elapsed time being clocked has exceeded the threshold time, the determiner 66 requests the job state to the controller 24 (Sb336). In response to the job state request, the controller 24 transmits the job state to the device-side processing unit 62 (Sb338). The determiner 66 of the device-side processing unit 62 determines whether the job is in progress in the image forming device 12 based on the job state. When it is determined that the job is not in progress, the determiner 66 outputs the determination result indicating the status to the output unit 68. Note that the job in progress here includes a state of being scanning or printing a large number of sheets. In such a case, the user tends to wait in front of the operation device 26 without operating the operation device 26 even if the user knows the method of operation, whereby the necessity of outputting the help content is low.

When the determination result indicating that the job is not in progress is obtained, the output unit 68 obtains the help content, and causes a display device 38 to display the content (Sb216 to Sb220).

When the job state indicates the state in progress, the determiner 66 resets the elapsed time (Sb340).

The operation device 26 according to the second embodiment outputs the help content based on the job state of the image forming device 12. As a result, the operation device 26 can output the help content based on the job state when the necessity is high.

The operation device 26 resets the elapsed time when the job is started and the job is in progress. In this case, the operation device 26 does not output the help content. As a result, the operation device 26 can reduce the display of the help content with low necessity during the job in which the user does not normally operate, whereby the processing load can be reduced.

Third Embodiment

Next, a third embodiment in which a threshold time is set according to a user attribute will be described.

A determiner 66 according to the third embodiment sets the threshold time corresponding to an attribute of, for example, a device administrator of the user in a logged-in state in an image forming device 12, and outputs help content based on the threshold time. Specifically, the determiner 66 determines whether the user is authenticated. For example, the determiner 66 may determine whether the user is authenticated based on a user ID and a password input to an operation receiving unit 40. The determiner 66 may determine whether the user is authenticated using face authentication, fingerprint authentication, or the like. When the user is not authenticated, that is, when the user is logged in and cannot be identified, the determiner 66 sets the threshold time to a first time.

When the user is authenticated, that is, when the user logs in, the determiner 66 determines whether the user in the logged-in state is the device administrator of the image forming device 12. For example, the determiner 66 may refer to the attribute of the user registered in a user database stored in a device-side storage 64 in advance based on the user ID and the password input to the operation receiving unit 40, to determine whether the user is the device administrator. When it is determined that the user in the logged-in state is the device administrator, the determiner 66 sets the threshold time to a second time shorter than the first time. When it is determined that the user is a general user and is not the device administrator, the determiner 66 sets the threshold time to the first time. For example, the first time may be 30 seconds, and the second time may be 20 seconds. The determiner 66 determines whether an elapsed time has exceeded the threshold time based on the set threshold time.

Figure 11:
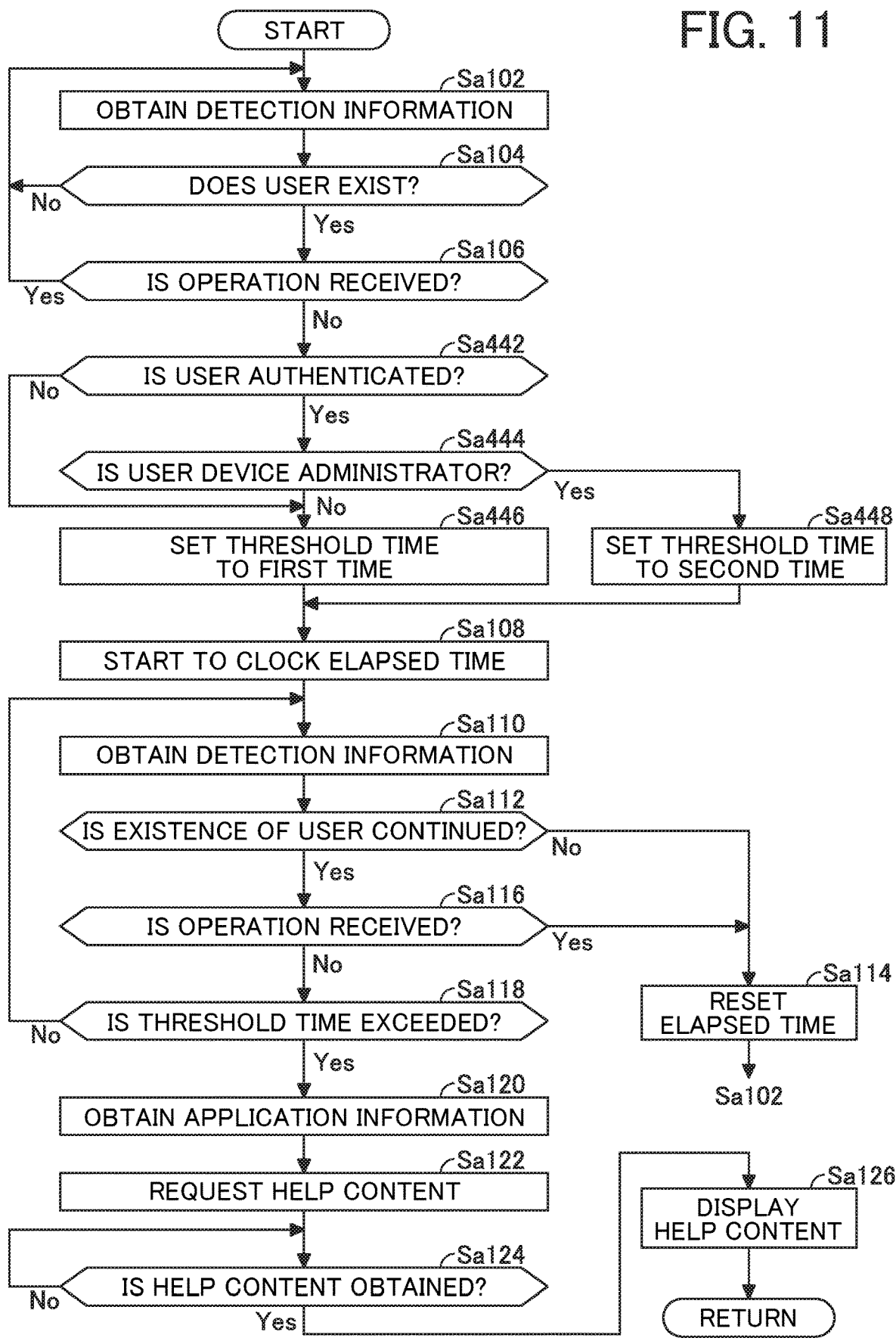
FIG. 11 is a flowchart illustrating a content display process performed by the operation device according to a third embodiment.

FIG. 11 is a flowchart of a content display process according to the third embodiment executed by device-side processing unit 62 of an operation device 26. Among the processing in the third embodiment, descriptions of processing similar to that in the embodiments described above will be omitted or simplified.

In the content display process according to the third embodiment, the determiner 66 determines whether the user is authenticated after executing steps Sa102 to Sa106 (Sa442). When it is determined that the user is not authenticated (No in Sa442), the determiner 66 sets the threshold time to the first time (Sa446). On the other hand, when it is determined that the user is authenticated (Yes in Sa442), the determiner 66 determines whether the user is the device administrator of the image forming device 12 (Sa444). When it is determined that the user is not the device administrator (No in Sa444), the determiner 66 sets the threshold time to the first time (Sa446). When it is determined that the user is the device administrator (Yes in Sa444), the determiner 66 sets the threshold time to the second time (Sa448). Thereafter, the determiner 66 and an output unit 68 executes processing in step Sa108 and the subsequent steps based on the set threshold time.

Since the threshold time for displaying the help content is set according to the user, the operation device 26 according to the third embodiment can appropriately display the help content according to the user. For example, in the case of a device administrator who frequently performs complex setting of the image forming device 12, the operation device 26 can promptly display the help content related to setting items, a setting method of a setting value, and the like as compared with a general user.

Note that, although the determiner 66 sets the threshold time according to whether or not the user is the device administrator in the third embodiment, the user classification is not limited to whether or not the device administrator. For example, the determiner 66 may classify the user into a device administrator, a customer engineer, and other general users to set the threshold time. In this case, the customer engineer may take a third time (e.g., 10 minutes) longer than the first time of the general user (e.g., 30 seconds) and the second time of the device administrator (e.g., 20 seconds). As a result, a configuration in which the determiner 66 seldom displays the help content for the customer engineer familiar with the image forming device 12 can be adopted. Note that the determiner 66 may not display the help content for the customer engineer.

The function, connection relationship, number, arrangement, and the like of the configuration in each embodiment described above may be modified, deleted, or the like as appropriate within the scope of the invention and within the range equivalent to the scope of the invention. Each embodiment may be combined as appropriate. The order of the steps in each embodiment may be changed as appropriate.

Although the exemplary case where the electronic device is the image forming device 12 has been described in the embodiments described above, the electronic device may be the operation device 26, or may be another device for displaying the help content.

In the embodiments described above, the exemplary case where the image forming device 12 according to the present invention is applied to the multifunction peripheral having at least two functions of the copy function, printer function, scanner function, and facsimile function has been described. However, it can be applied to any image forming device such as a copier, printer, scanner, and facsimile device.

Although the help content has been exemplified as the content related to the method of operating the image forming device 12 in the embodiments described above, the content may be a manual or the like.

Although the exemplary cases where the output unit 68 outputs the image of the help content has been described in the embodiments described above, the output unit 68 may output the help content using voice, or the image and voice.

Although the exemplary case where the electronic device is the image forming device 12 has been described in the embodiments described above, the electronic device may be a household appliance, such as a personal computer (PC), smartphone, tablet PC, projector, electronic blackboard, and a television, which includes a detector for detecting the user or which is connected to a detection device for detecting the user, and outputs content related to a method of operation at the time when the user operates the electronic device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An electronic device comprising:
a display;
a sensor configured to,
sense a user in a detection range of the electronic device, and
output detection information indicating that a user is in the detection range; and
processing circuitry configured to cause the electronic device to,
determine whether a user is in the detection range based on the detection information outputted by the sensor, and
display, on the display, content for assisting an operation user in operating the electronic device, when the processing circuitry has determined that
a user is in the detection range, and
no other operation has been received from the operation user during a period of time from a start of an elapsed time corresponding with receiving an operation from the operation user until the elapsed time exceeds a threshold time.

2. The electronic device according to claim 1,
wherein the processing circuitry is further configured to cause the electronic device to obtain the content during a period from a time the sensor senses a user in the detection range until the elapsed time exceeds the threshold time.

3. The electronic device according to claim 1,
wherein the processing circuitry is further configured to cause the electronic device to
determine a state of a job being executed or to be executed in the electronic device, and
display the content for assisting the operation user based on the state of the job.

4. The electronic device according to claim 3,
wherein the processing circuitry is further configured not to cause the electronic device to display the content based on a determination that the state of the job is in progress.

5. The electronic device according to claim 3,
wherein the processing circuitry is further configured to cause the electronic device to reset the elapsed time based on a determination that the state of the job is in progress.

6. The electronic device according to claim 1,
wherein the processing circuitry is further configured to cause the electronic device to authenticate the operation user to allow the operation user to log in to the electronic device, and set the threshold time according to an attribute of the operation user who has logged in.

7. The electronic device according to claim 1 further comprising:
an operation receiver including any one of a button, a switch, and a touch panel.

8. The electronic device of claim 7, further comprising:
a user interface configured to interact with the operation user, the user interface including the operation receiver and the sensor.

9. A system comprising:
an electronic device including a display and processing circuitry; and
a detection device including,
a sensor configured to,
sense a user in a detection range of the electronic device, and
output detection information indicating that a user is in the detection range,
wherein the processing circuitry is configured to cause the electronic device to,
determine whether a user is in the detection range based on the detection information outputted by the sensor, and
display, on the display, content for assisting an operation user in operating the electronic device, when the processing circuitry has determined that
a user is in the detection range, and
no other operation has been received from the operation user during a period of time from a start of an elapsed time corresponding with receiving an operation from the operation user until the elapsed time exceeds a threshold time.

10. A method for processing information, the method comprising:
detecting a user in a detection range of an electronic device;
generating detection information based on the detection of a user;
determining whether a user is in the detection range based on the detection information; and
displaying content for assisting an operation user in operating the electronic device, when
a user is determined to be in the detection range, and
no other operation has been received from the operation user during a period of time from a start of an elapsed time corresponding with receiving an operation from the operation user until the elapsed time exceeds a threshold time.

11. The method of claim 10, further comprising:
obtaining the content during a period from a time a user is detected in the detection range until the elapsed time exceeds the threshold time.

12. The method of claim 10, further comprising:
determining a state of a job, the job being executed or to be executed in the electronic device,
wherein the displaying the content is performed based on the state of the job.

13. The method of claim 12, further comprising:
resetting the elapsed time based on a determination that the state of the job is in progress.

14. The method of claim 10, further comprising:
authenticating the operation user;
allowing the operation user to log in to the electronic device; and
setting the threshold time based on an attribute of the operation user who has logged in.

15. The electronic device according to claim 8,
wherein the processing circuitry is further configured to cause the electronic device to determine the content for assisting the operation user based on an application displayed on the user interface.

16. The electronic device according to claim 1,
wherein the processing circuitry is further configured to cause the electronic device to obtain the content for assisting the operation user from a content management table.

17. The electronic device according to claim 1,
wherein the content for assisting the operation user is based on an application displayed on the display at the threshold time, and the content for assisting the operation user is separate from the application displayed on the display at the threshold time.

18. The system according to claim 9,
wherein the content for assisting the operation user is based on an application displayed on the display at the threshold time, and the content for assisting the operation user is separate from the application displayed on the display at the threshold time.

19. The method according to claim 10,
wherein the content for assisting the operation user is based on an application displayed on the display at the threshold time, and the content for assisting the operation user is separate from the application displayed on the display at the threshold time.

\* \* \* \* \*